United States Patent Office 3,479,799
Patented Nov. 25, 1969

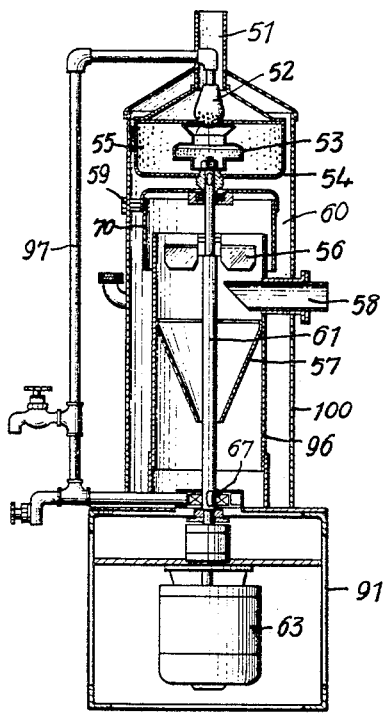
FIG_7
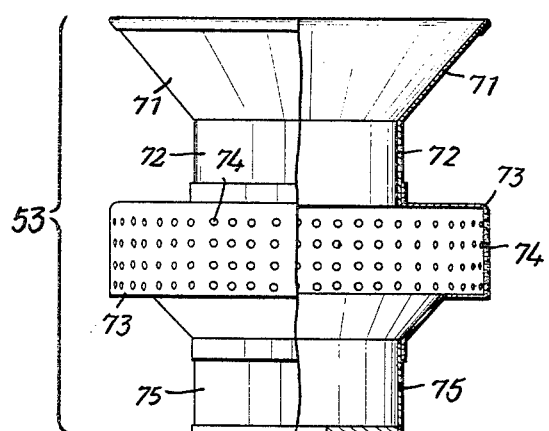
FIG_8

3,479,799
APPARATUS FOR PURIFYING POLLUTED GAS
Toyohiko Aoki, Tokyo, Japan, assignor to Naigaikogyo
Kabushiki Kaisha, Tokyo, Japan
Filed Mar. 10, 1967, Ser. No. 622,135
Int. Cl. B01d 47/16, 47/02
U.S. Cl. 55—230                    2 Claims

ABSTRACT OF THE DISCLOSURE

A gas liquid contact apparatus having rotating agitating, contacting and separating mechanisms being rotated by a common shaft. The agitating, contacting and separating mechanisms are positioned within a tank.

---

This invention relates to an apparatus for purifying polluted gas and aims at providing effective means for purifying waste gas and other polluted gas produced by various kinds of factory equipments, heating or burning equipments, and further internal and external combustion engines for automobile, ships, etc., and for eliminating odour of such gases.

It is required to purify exhaust gas produced by various kinds of factory equipments, heating, burning and kitchen equipments, transportation engines such as automobile, marine and other engines, and air polluted by dust in various shops and gaseous elements produced by diffusion or reaction. To this end are provided various kinds of wet or dry purification means. However mechanism according to prior method becomes large sized but can achieve no effective purification of fine powder such as of 1 micron or below and gaseous element. Especially in wet system using water and other liquid, it is technically hard to contact liquid with powder dust or gas in full and moreover not easy to separate the mixture into said liquid, gas and others again. The present invention intends to dissolve such disadvantages of prior mechanism and purify fine powder of below 1 micron and gaseous element effectively with relatively simple and small sized mechanism.

The basic object of the present invention is to make an effective purification of polluted gas. To this end the present invention supplies polluted gas and water and other liquid in dispersed state into finely perforated rotary drum so as to contact gas and liquid with each other, passes them at approximately equal speed through fine perforations of said rotary drum so as to contact them with each other concentrically, then disperses them again by centrifugal force produced by high speed rotation of rotary drum and creates any flying speed of gas or liquid owing to the differences of qualities or quantities thereof so as to fully mix or contact them with each other outside drum by accompanying movement of gas and liquid. If necessary, above operations may be repeated in cycles. Then gas is mixed with liquid and at that time fine particles and harmful elements which were conveyed by polluted gas are positively transferred into liquid. It is possible to catch even fine particle elements below 1 to about 0.25 micron positively and also remove harmful gas appropriately. Generally it is reported that dust of more than 20 microns floating in air does not reach lungs of human beings. More than 30% settles in pharynx portion and trachea, and more than 60% reaches bronchi. Dust of smaller size reaches bronchi and bronchial tree and is evacuated out of body by for example phlegm. Nearly 50% of dust especially as small as 2 microns reaches bronchial tree and lungs. Moreover 80 to 90% of sooty dust, so-called smog, is below 2 microns. This fine dust attacks lungs and respiratory organs and often causes various diseases such as toxic or allergic disease and skin disease. Such being the case the provision of effective purifying measurement against such sooty dust consisting of microparticles substantially of below 2 microns is also urgently required in social meaning. A relatively simple and popular measurement for this purpose is a method utilizing liquid drops. Viewed from technical standpoint, this method has been reported to show high efficiency to particles of more than 1 micron, but to be less effective to those below 1 micron. So it cannot be necessarily available to sooty dust effectively. The present invention, though utilizing liquid drops, can effect a purification of high efficiency to fine dust of 0.5 micron or below to the extent of 0.25 micron, by providing aforementioned special means.

Another important object of the present invention is to accomplish above purification by a relatively small mechanism. To this end the present invention provides concentrically finely perforated rotary drum and rotary agitation mechanism for dispersing liquid and stirring and mixing gas and liquid. Said centrally located rotary agitation mechanism disperses liquid and mixes gas and liquid which are then immediately contacted wth each other effectively by squeezing action and accompanying action of the present invention caused by rotary drum. This accompanying action can contact gas and liquid with less resistance and in a sufficiently elongated period, as compared with system of opposite flow of crossing of gas and liquid. So an effective contact of gas and liquid can be achieved with small type of device. Further the possibility of simply forming contact portion in the course of contact enables to obtain a full contact of gas and liquid with a considerably small type of device. The concentrically mounted rotary drum and rotary agitation mechanism is naturally mounted to a single rotary shaft. Although these rotary members are provided on rotary shaft in a vertically reduced section, above agitation, mixture and contact of gas and liquid can be repeated in the reduced section. In this respect the present invention also reduces the whole mechanism into small type and sometimes to the extent of being accommodated in for example flue of waste gas. The provision of agitation mechanism also capable of dispersing liquid in rotary drum enables to perform contact of gas and liquid effectively in the middle portion of rotary drum, too. This permits to reduce as much rotary drum as well as the whole mechanism in size, as compared with prior system of for example dispersing liquid by centrifugal force, and then contacting gas and liquid. Further for separating gas and liquid again, the present invention can also mount cyclone and other separating mechanism to said contact mechanism simply and easily. This enables to achieve the proposed object with a markedly smaller sized construction than the prior same kind of purifying device.

Another object of the present invention is to provide a method for purifying polluted gas and apparatus therefor, effectively combined with separating mechanism for reseparating gas and liquid which are mixed and contacted with each other. In method for purifying polluted gas utilizing liquid drop as in the present invention, not only an effective mixture and contact of gas and contact are of importance, but it is required to separate again gas and liquid thus mixed and contacted. These requirements have been hard to satisfy in one device. In order to solve these problems, the present invention adopts rotary drum for contact mechanism and a cyclone for separating mechanism. The rotary drum as contact mechanism not only shows effective contact of gas and liquid as above stated, but also has separating function. Namely centrifugal force produced by rotation of said drum disperses gas and liquid circumferentially, so that gas and liquid are separated from each other by the difference of mass between these materials. On the other hand, cyclone as separating mechanism belongs in itself to one of typical types in mechanical dust collecting techniques. So when it is adopted as separating mechanism, it can also demonstrate a secondary dust collecting and purifying function. The present invention thus doubles both purification and separation processes with result of prominent purifying effect. Moreover viewed from technical standpoint, either rotary drum or cyclone has a round flat face, preferably for their use in combination. Moreover rotary drum and fan of cyclone agree with each other in form of operation, and all movements of gas and liquid obtained from respective mechanisms become turning movements without resistance nor being forced so that inertia can be utilized rationally for either working of mechanism or movement of gas and liquid. This permits to form a relatively small shaped purification apparatus with smooth operation.

Another object of embodiment of the present invention is to fabricate a simplified rotary agitation mechanism for effective dispersion and jet of liquid for mixing liquid with gas. To this end an embodiment of the present invention adopts as rotary agitation mechanism a device made by the steps of stamping a band-shaped sheet rectangularly leaving one longitudinal side, folding this stamped portion outside, dividing this portion into an approporiate number of divisional pieces and tortioning these divisional pieces, shaping the sheet thus machined into drum which is then provided with bottom plate. Such a rotary agitation mechanism has through holes in stamped and folded portion, thereby passing gas and liquid effectively through said holes. The divisional pieces obtained by dividing and folding stamped portion advantageously effect dispersion of liquid and agitation and mixture of gas and liquid. In above way of formation, such a rotary agitation mechanism can be formed simply and economically out of a single sheet of metal or others and moreover can perform dispersion of liquid and agitation and mixture of gas and liquid effectively in one unit.

Another object of embodiment of the present invention is to advantageously utilize liquid to contact with polluted gas. To this end, an embodiment of the present invention receives liquid separated by separating operation in appropriate storage tank, appropriately separates solid or harmful elements conveyed by said liquid, and then guides liquid free of such elements by suction pump again into contact mechanism for cycling use. Such cycling use of liquid is advantageous especially for purifying medicine or other reactive elements mixed with liquid and effects economical purification of the mixture.

The constitutional relations of an apparatus which are recognized to characterize the present invention are indicated in claims. However further concrete object and effect and merits of the present invention will be clearly understood by reading the explanation of embodiment with reference to attached drawing showing embodiment of apparatus of the present invention, wherein;

FIG. 7 is a vertical sectional view of another embodiment of the present invention.

FIG. 8 is a partially broken away of the first rotary drum serviceable for turning agitation of FIG. 7.

Figure 1:
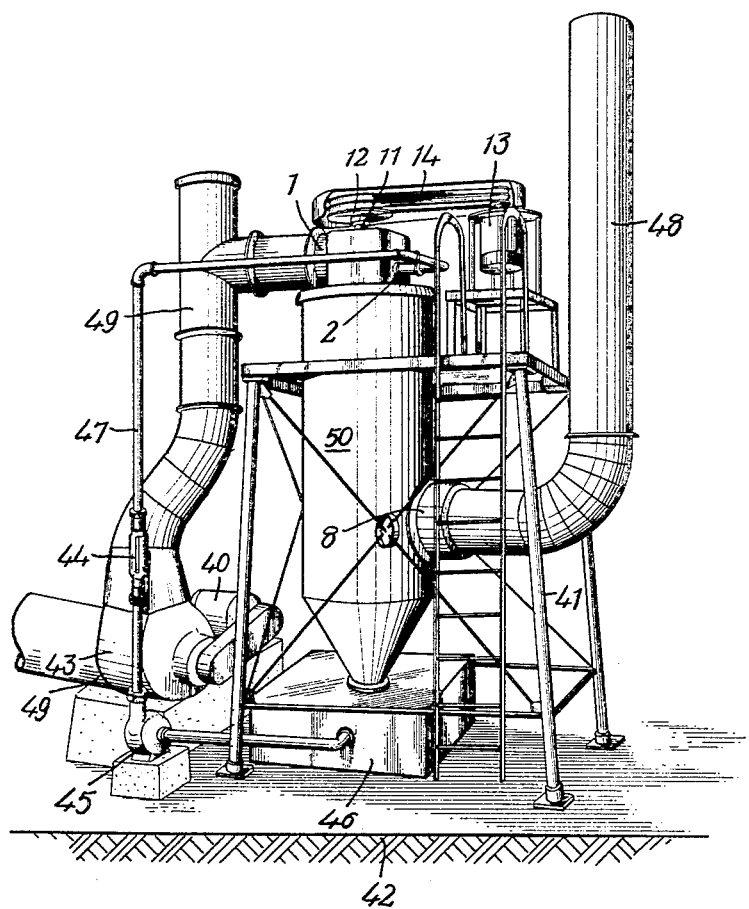
FIG. 1 is an exterior view of the purifying apparatus according to the present invention installed for purifying waste gas, including piping construction.

An explanation will be given hereinafter on the embodiments shown in above figures. In FIGS. 1 to 4, vertical tank 50 is supported on foundation 42 by appropriate support structure. Exhaust pipe 49 connected with abovestated source of polluted gas such as combustion mechanism and others has a fan chamber 43 driven by motor 40 and is connected with polluted air inlet 1 provided in the upper portion of tank 50. Air conduit 48 connected with purified air outlet 8 provided in intermediate side of tank 50 is adapted to guide purified air to a position required. In the upper portion of tank 50 is provided inlet 2 of washing liquid which is connected with liquid conduit 47 coming from storage tank 46 through suction pump 45. Said tank 50 is mounted on this storage tank 46. Flow meter 44 is provided to liquid conduit 47. From the upper portion of tank 50 is projected rotary shaft 11. Over pulley 12 fixed to upper end of said rotary shaft 11 and motive mechanism, such as motor, provided adjacent pulley 12 is mounted endless belt 14 for transmitting driving force produced from motive mechanism 13 to rotary shaft 11.

Figure 2:
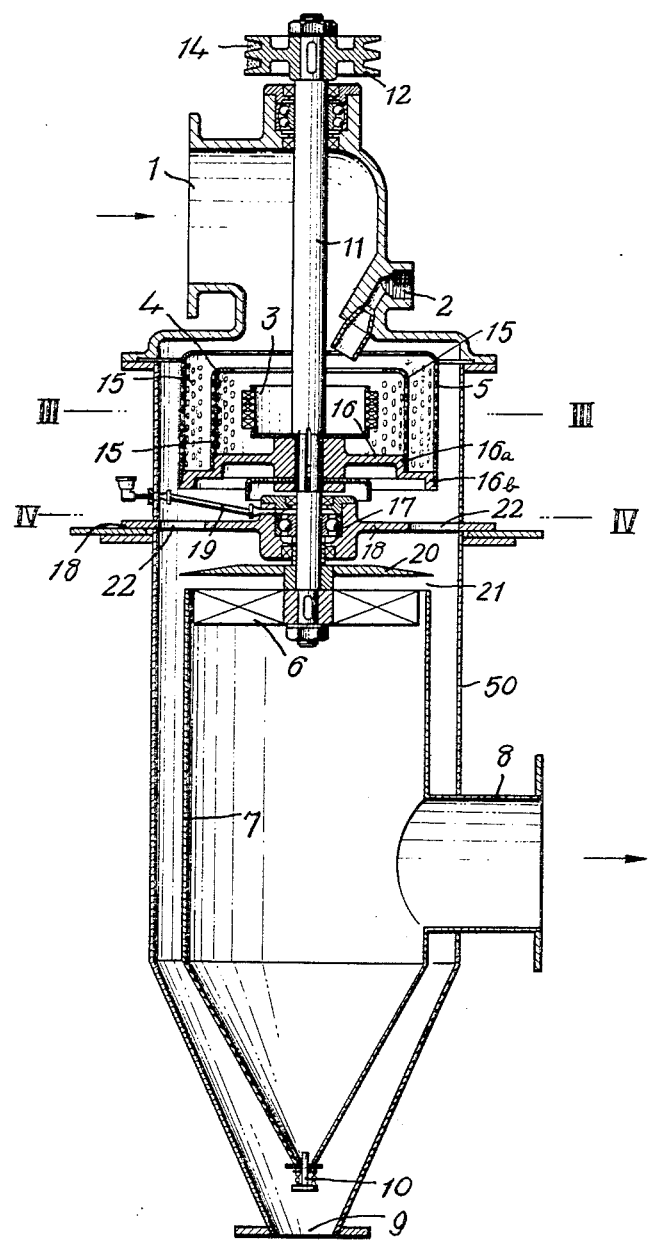
FIG. 2 is a sectional view of the purification mechanism portion of the apparatus shown in FIG. 1.
Figure 3:
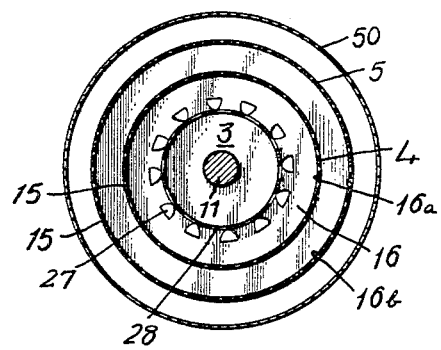
FIG. 3 is a cross sectional view along line III—III of FIG. 2.
Figure 4:
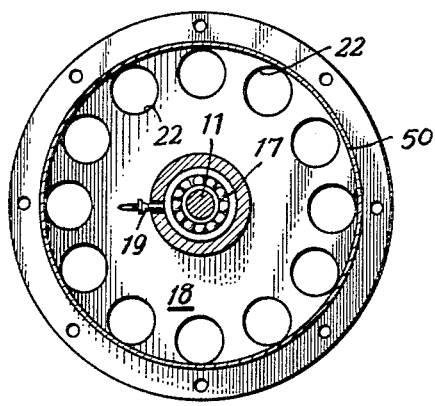
FIG. 4 is a cross sectional view along line IV—IV of FIG. 2.

In tank 50 is provided purification mechanism of the present invention as shown in FIG. 2 and the following. Particularly rotary shaft 11 suspended in the middle of tank 50 from upward is fixed with holding plate 16 in the upper portion of tank 50. This holding plate 16 forms at least one fixing stepped portion 16a. Rotary drums 4 and 5 respectively cylindrical and all over perforated with perforations 15 are concentrically fixed, taking spaces suitably, to outer peripheral end portion concentric with said fixing stepped portion. Respective end portions of these rotary drums 4 and 5 are a little inward folded so as to embrace the interiors of said rotary drums. In rotary drums 4 near the center is so provided rotary agitation mechanism 3 which is also fixed to rotary shaft 11 as to admit all amounts of gas and liquid practically supplied. In the upper portion of this agitation mechanism washing liquid supplied from inlet 2 is jet toward the center. By this jet of washing liquid is rotated this rotary agitation mechanism 3 accompanied by rotary drum. The rotation of this rotary agitation mechanism 3 makes washing liquid supplied disperse in rotary drum 4. Then polluted gas is introduced into thus dispersed washing liquid from inlet 1 in the upper portion of tank 50, so as to mix washing liquid and polluted gas simultaneously. Molding seat 18 having bearing mechanism 17, provided under support plate 16 in tank 50 supports lower portion of rotary shaft 11. Said bearing mechanism 17 attached with oiling mechanism rotates smoothly at all times. Rotary shaft 11 projects a little under holding seat 18, with projecting portion fixed with partition plate 20 and rotary fan 6 which are driven altogether by said rotation of rotary shaft. Rotary fan 6 is situated in the upper portion of cyclone chamber 7, separation mechanism, provided in lower portion of drum 5. The upper opening portion of this cyclone chamber 7 is covered by said partition plate 20. Liquid or dust coming from contact mechanism comprising rotary drums 4 and 5 are received at first separately by partition plate 20 and discharged out of peripheral side by rotation of partition plate. During discharge substantially only gas, or a very small quantity of microparticles of liquid drops or dust elements floating in gas is introduced into cyclone chamber 7 through clearance 21. Inside portion near the lower portion of cyclone chamber 7 is opened purified air outlet 8 through which purified air is guided out. Convergent lower end portion of this cyclone chamber 7 is fitted with gargle valve 10 which is constructed to discharge downward liquid drops or micropowder coming down along inside wall of cyclone chamber 7 after being separated in same chamber. Tank 50 is also converged in the lower portion parallelly to the lower portion of cyclone chamber 7 to discharge out of lower end outlet 9 a quantity of liquid and solid elements flowing down along inside of tank, together with fine liquid drops or dust discharged through said gargle valve 10. Liquid conveying solids discharged out of this outlet 9 is carried into storage tank 46 in which solid is settled and from which only liquid is supplied into said contact mechanism by suction pump 45.

Figure 5:
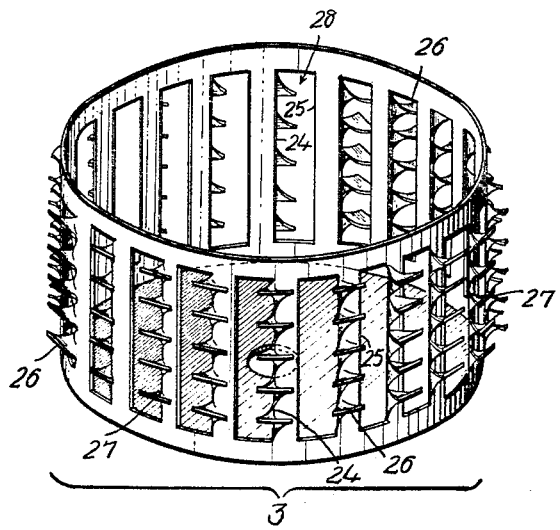
FIG. 5 is a perspective view of the rotary agitation mechanism of FIG. 1.

A concrete construction of rotary agitation mechanism 3 of above construction is shown in FIG. 5. Particularly metal sheet or synthetic resinous sheet is adopted as blank to be circularly curved for forming peripheral wall of said mechanism 3. This blank sheet 23 is stamped to form stamped portion 25 with one side left at a fixed distance. This stamped portion is folded rectangularly outside mechanism 3 along basic portion and divided into any desired number of small pieces 26 which are respectively twisted 27 in intermediate portion. By above upright folding of stamped portion 25, a rectangular opening 28 is formed in said portion. By rotating said opening gas and liquid which were introduced into mechanism 3 are jet outside through said opening 28. Gas and liquid in jet is subjected to agitation action of divisional piece 26 and radial converting action produced by twisted portion 27, thereby approximately effecting dispersion of liquid as well as agitation and mixture of gas and liquid and jetting in parallel.

Figure 6:
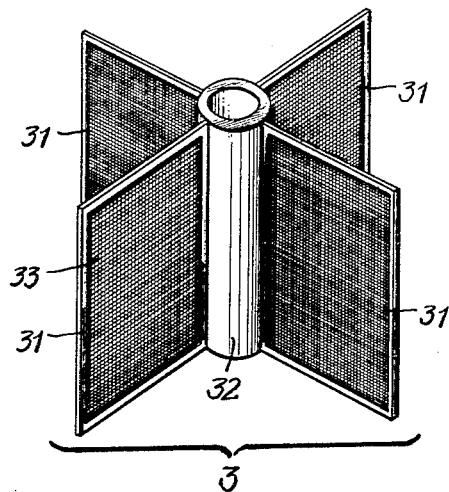
FIG. 6 is a side view of a modification of rotary agitation mechanism.

Above stated rotary agitation mechanism 3 may be simply formed of one sheet of plane blank, but for carrying out the present invention rotary agitation mechanism is not of course confined to above embodiment. Namely FIG. 6 exemplifies a modified rotary agitation mechanism of construction comprising fixing a plurality of square network 31 in appropriate width vertically and radially to axial portion 32 to form one agitation wing. Width of network 31 is determined by taking into account time for which poured liquid drops go down through thus rotating rotary agitation mechanism 3, its actual rotation speed and distances between respective networks 31. Said width should be larger than the extent not to fail to catch liquid drops going down by gravity with network 31, not to permit them merely to pass. In this way poured liquid drops are positively caught on network 31 and spread toward peripheral end by rotation of network and at the same time dispersed through meshes 33 to fly to next network and at last scattered in fine liquid drop. Further liquid thus spread and developed on wire network comes to have a fully expanded area which effectively contacts with polluted gas passing through meshes 33 and also agitates polluted gas for effective contact between gas and liquid.

The provision of perforations 15 in rotary drums 4 and 5 are appropriately determined taking into consideration property of polluted gas to be processed, amount of supply of liquid and revolutions of respective rotary drums 4 and 5. Generally round perforations 15 diametrally in the order of 3 mm. are provided at a distance in the order of 5 mm. The processing with such perforations under operation conditions as shown in Table 1 hereinafter gives effective squeezing action followed by accompanying movement to waste gas such as obtained from ordinary combustion device, so that even microparticles in the order of 0.25 micron as well as odour can be almost positively eliminated.

In case of eliminating gaseous elements for the purposes such as removal of odour, appropriate medicine is mixed in above liquid according to nature of source of the polluted gas. For example, in general waste gas processing, liquid mixed with 1 to 1.5 weight percent of for example chrolorous acid soda or caustic soda shows an effective deodorizing effect. When such a medicine is used, stainless steel rubber lining, vinyl chloride or other synthetic resinous material or synthetic resinous lining material are adopted as construction member to avoid corrosion caused by the medicine.

Above apparatus according to the present invention may be formed in appropriate size. Some examples of size, gas processing capacity, pressure loss, motor, quantity of circulating liquid and suction pump of tank 50 representing the apparatus of the present invention are shown in Table 1.

| Size of tank (dia.) mm. | Amount of gas disposal (m.³/hr.) | Pressure loss, mm. Hg | Motor, 3 phase, 200 v (kw.) | Cyclic solution and suction pump thereof |
|---|---|---|---|---|
| 400 | 1,000 | 100–120 | 3.7 | 110 l./min. (0.4 kw.). |
| 600 | 2,200 | 100–120 | 5.5 | 210 l./min. (0.75 kw.). |
| 800 | 3,500 | 100–120 | 7.5 | 420 l./min. (2.2 kw.). |

FIG. 7 and FIG. 8 show another embodiment of the present invention. While the apparatus shown in FIGS. 1 to 4 is of upper drive system which suspends rotary shaft 11 from above tank 50, FIGS. 7 and 8 show lower drive system which is driven by motive mechanism 63 provided in support structure 91 under tank 100. Rotary shaft 61 extending into tank 100 is fixed with rotary agitation mechanism 53 and rotary drum 54 at the upper end. Under said rotary shaft is provided sirocco fan 56 situated in the upper portion of cyclone chamber 57. Above this cyclone chamber 57 is fixed cover member 70 at an appropriate distance 60 by fixing member 59 so as to cover cyclone chamber. In the intermediate side of cyclone chamber 57 is opened exhaust opening 58 extending outside tank 100. Said funnel-shaped cyclone chamber 57 is connected with storage tank 96 in the lower portion. Rotary shaft 61 has pump 67 under storage tank 96 rotatably supported by bearing mechanism 68 provided in the middle portion of said cover member 70. Liquid conduit 97 opened in storage tank 96 is adapted to guide liquid fed upward through the medium of suction pump 67 into washing liquid inlet portion 52 situated on rotary agitation mechanism 53. Said inlet portion 52 is situated coaxially with polluted gas inlet 51 at the upper end of tank 100. Rotary agitation mechanism 53 of this embodiment is concretely of a special form as shown in FIG. 2. Particularly funnel-shaped portion 71, neck portion 72, bulged drum portion 73 and mounting base portion 75 are formed in sequence from upper part and fixed to the upper end of rotary shaft 61 by mounting base. Rotary drum 54 and intermediate bulged drum portion 73 sufficiently bulged larger than mounting base portion 75 and neck portion 72 are all over provided with perforations 74 and 55.

In the structure shown in FIGS. 7 and 8 rotary drum 54 provided above tank 100 is rotated unitarily with rotary agitation mechanism 53. Appropriately pressurized liquid is jet and flown down from washing liquid inlet portion 52 into rotary agitation mechanism 53 and at the same time polluted gas is fed into said mechanism from polluted air inlet 51. Liquid and polluted gas which were introduced into rotary agitation mechanism 53 are sufficiently agitated and mixed by rotation of said mechanism, and guided by centrifugal force of same mechanism into bulged drum portion 73. Due to the difference of radius of rotation, in this portion inflow is larger than outflow so that pressure is reduced. In this way it is intended to suction polluted gas from polluted gas inlet 51 by this reduction of pressure, guide this polluted air into rotary agitation mechanism 53 not permitting it to escape outside, thereby effecting positive mixing and contact with liquid firstly in said mechanism 53. Perforations 74 of bulged cylindrical portion 75 function similarly to those 15 of aforementioned rotary drum 4 shown in FIGS. 1–4 so as to perform contact and accompanying actions between gas and liquid. To gas and liquid which were thus jet from perforations 74, similar actions are also performed in rotary drum 54. This is almost similar to the aforementioned. The action of cyclone chamber 57 in subsequence is also substantially of no difference of significance.

What I claim is:

1. An apparatus for purifying polluted gas comprising a contacting mechanism and a separating mechanism wherein said contacting mechanism consists of a rotary drum provided with perforation in the peripheral wall of said contacting mechanism and a rotary agitation mechanism which is in concentric relation with said rotary drum, cyclone having a fan as said separating mechanism, tank for gas accommodating said rotary drum, rotary agitation mechanism and separating mechanism and having gas inlet, washing liquid inlet, purified gas outlet and washing liquid outlet passage for mixture of gas and liquid between said tank and said contacting mechanism into said separating mechanism means in said tank for driving said rotary drum, rotary agitation mechanism and cyclone fan, discharging by centrifugal force substantial amounts of gaseous and liquid mixture by the rotary agitation mechanism, passing a substantial amount of gas and liquid mixture through the perforations in said contacting mechanism and thereafter introducing said mixture to said separating mechanism for separating the gas and liquid, stamping rectangular holes in a cylindrical sheet material forming the rotary agitation mechanism provided within the contacting mechanism, folding outside the stamped portion, dividing said holes in appropriate members and then adopting twisted divisional pieces, and discharging in parallel mixture of gas and liquid, adopting the rotary agitation mechanism which is provided within the contacting mechanism and is formed by mounting network member radially to the shaft member.

2. An apparatus for purifying polluted gas comprising a contacting mechanism and a separating mechanism wherein said contacting mechanism consists of a rotary drum provided with perforations in the peripheral wall of said contacting mechanism and a rotary agitation mechanism which is in concentric relation with said rotary drum, cyclone having a fan as said separating mechanism, tank for gas accommodating said rotary drum, rotary agitation mechanism and separating mechanism and having gas inlet, washing liquid inlet, purified gas outlet and washing liquid outlet passage for mixture of gas and liquid between said tank and said contacting mechanism into said separating mechanism, means in said tank for driving said rotary drum, rotary agitation mechanism and cyclone fan, discharging by centrifugal force substantial amounts of gaseous and liquid mixture by the rotary agitation mechanism, passing a substantial amount of gas and liquid mixture through the perforations in said contacting mechanism and thereafter introducing said mixture to said separating mechanism for separating the gas and liquid, adopting the rotary agitation mechanism which is provided within the contacting mechanism and is formed by mounting network member radially to the shaft member, forming stepped portion appropriately to a holding plate mounted on the rotary shaft provided with the contacting mechanism and providing rotary agitation mechanism and rotary drum on top surface, side surface of holding plate or end edge surface of holding plate, taking spaces appropriately.

References Cited
UNITED STATES PATENTS

| | | | |
|---|---|---|---|
| 2,698,745 | 1/1955 | Boucher | 55—230 |
| 1,057,613 | 4/1913 | Baldwin | 261—88 |
| 1,218,354 | 3/1917 | Baldwin | 55—91 |
| 2,007,759 | 7/1935 | Harmon | 55—235 |
| 3,173,771 | 3/1965 | Barrett et al. | 55—92 |
| 3,205,641 | 9/1965 | Jamison et al. | 55—236 |
| 3,323,290 | 6/1967 | Stern | 55—92 |
| 3,358,413 | 12/1967 | Kalika | 55—238 |

FOREIGN PATENTS 699,338  11/1953  Great Britain.

REUBEN FRIEDMAN, Primary Examiner

CHARLES N. HART, Assistant Examiner

U.S. Cl. X.R.

55—257